US009811190B2

(12) United States Patent
Ma et al.

(10) Patent No.: US 9,811,190 B2
(45) Date of Patent: Nov. 7, 2017

(54) DISPLAY DRIVING METHOD AND APPARATUS FOR IN-CELL TOUCH DISPLAY SCREEN, AND DISPLAY APPARATUS

(71) Applicants: Boe Technology Group Co., Ltd., Beijing (CN); HEFEI XINSHENG OPTOELECTRONICS TECHNOLOGY CO., LTD., Hefei, Anhui (CN)

(72) Inventors: Tao Ma, Beijing (CN); Hengbin Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 101 days.

(21) Appl. No.: 14/770,391

(22) PCT Filed: Oct. 17, 2014

(86) PCT No.: PCT/CN2014/088829
§ 371 (c)(1),
(2) Date: Aug. 25, 2015

(87) PCT Pub. No.: WO2015/196648
PCT Pub. Date: Dec. 30, 2015

(65) Prior Publication Data
US 2016/0085374 A1   Mar. 24, 2016

(30) Foreign Application Priority Data
Jun. 26, 2014   (CN) .......................... 2014 1 0299202

(51) Int. Cl.
*G06F 3/041*        (2006.01)
*G06F 3/044*        (2006.01)
(Continued)

(52) U.S. Cl.
CPC ............ *G06F 3/0412* (2013.01); *G06F 3/044* (2013.01); *G06F 3/0418* (2013.01);
(Continued)

(58) Field of Classification Search
CPC ...... G06F 3/0488; G06F 3/044; G06F 3/0412; G06F 3/0416; G06F 3/0425; G09G 3/3406
See application file for complete search history.

(56) References Cited

U.S. PATENT DOCUMENTS

2012/0162133 A1* 6/2012 Chen ..................... G06F 3/0418
345/174
2013/0093724 A1* 4/2013 Liu ....................... G06F 3/0412
345/174
(Continued)

FOREIGN PATENT DOCUMENTS

CN    201590059 U    9/2010
CN    202995200 U    6/2013
(Continued)

OTHER PUBLICATIONS

Second Chinese Office Action, for Chinese Patent Application No. 201410299202.0, dated Oct. 18, 2016, 9 pages.
(Continued)

*Primary Examiner* — Sanjiv D Patel
(74) *Attorney, Agent, or Firm* — Kinney & Lange, P.A.

(57) ABSTRACT

The present disclosure discloses a driving display method for an in-cell touch display screen. The method comprises the following steps: outputting a predetermined picture; performing initialization scanning on touch sensor elec-
(Continued)

trodes of a TFT array substrate to obtain initialization scanning data as basic data; alternately outputting a display picture and the predetermined picture, and after the predetermined picture is output, scanning the touch sensor electrodes to obtain display scanning data; comparing the display scanning data and the basic data to determine whether a touch occurs. The disclosure also discloses an in-cell touch display screen and a display apparatus with the in-cell touch display screen. By inserting a predetermined picture before normally display and between any two successive frames of the display picture and performing touch scanning each time a predetermined picture is displayed, the present disclosure can prevent the parasitic and coupling capacitors from affecting the scanning result of the touch control IC, and thus reduce the possibility of erroneous judgment of touches.

17 Claims, 6 Drawing Sheets

(51) Int. Cl.
    *G09G 3/34* (2006.01)
    *G09G 3/36* (2006.01)
(52) U.S. Cl.
    CPC ......... *G09G 3/3406* (2013.01); *G09G 3/3648* (2013.01); *G09G 2310/08* (2013.01); *G09G 2320/0626* (2013.01)

(56) References Cited

U.S. PATENT DOCUMENTS

| | | | | |
|---|---|---|---|---|
| 2014/0160058 A1* | 6/2014 | Chen | .................... | G06F 3/0412 |
| | | | | 345/174 |
| 2014/0210771 A1* | 7/2014 | Kim | .................... | G06F 3/0412 |
| | | | | 345/174 |
| 2014/0267349 A1* | 9/2014 | Lee | .................... | G06F 3/044 |
| | | | | 345/589 |

FOREIGN PATENT DOCUMENTS

| | | | |
|---|---|---|---|
| CN | 103677427 A | 3/2014 | |
| CN | 103970386 A | 8/2014 | |
| CN | 104076984 A | 10/2014 | |
| JP | 2012256180 A | 12/2012 | |
| JP | 103677427 A | 3/2014 | |

OTHER PUBLICATIONS

The International Written Opinion dated Mar. 27, 2015 for the International application No. PCT/CN2014/088829.
First Chinese Office Action (including English translation) dated Jun. 28, 2016, for corresponding Chinese Application No. 201410299202.0.
Third Chinese Office Action, for Chinese Patent Application No. 201410299202.0, dated Mar. 28, 2017, 9 pages.

* cited by examiner

Initial Data Picture

Display Picture

Initial Data Picture

Display Picture

DISPLAY DRIVING METHOD AND APPARATUS FOR IN-CELL TOUCH DISPLAY SCREEN, AND DISPLAY APPARATUS

TECHNICAL FIELD

The disclosure relates to the field of display technology, and particularly to a display driving method and apparatus for an in-cell touch display screen, and a display apparatus.

BACKGROUND

Currently, thinning and lightening of touch display panels for electronic products are increasingly demanded by manufactures and users. Accordingly, researches on integration of touch panel functionalities with a liquid crystal panel are becoming more and more popular as comparing to the conventional method in which a touch panel is simply arranged on a liquid crystal panel. In-cell touching technology is one of the technologies for integrating a touch panel with a liquid crystal panel, where the touch display screen functionalities are embedded into liquid crystal pixels.

In the up-to-date in-cell touching technology, touch sensor electrodes, i.e. touch driving electrodes Tx and touch sensing electrodes Rx, are fabricated on a TFT array substrate of a liquid crystal panel. In comparison with conventional capacitive touch display screen structures, this novel technique would save a touch glass substrate for every single structure, and thus make the entire display module thinner and lighter. FIG. 1 shows a diagram of a circuit structure of a liquid crystal screen using the in-cell touching technologies.

However, since the touch driving electrode Tx and the touch sensing electrode Rx are both fabricated on the TFT array substrate, there could be various parasitic capacitances and coupling capacitances between these electrodes and respective layers of electrodes of TFT. When the display is in operation, alternating variations of the voltages on TFT will introduce crosstalk to signals on the touch driving electrode Tx and the touch sensing electrode Rx, and thus significantly degrades the touching performance of the liquid crystal screen.

Additionally, in the conventional method, signal scanning of the touch driving electrode Tx and the touch sensing electrode Rx is synchronized with screen refreshing, because capacitive touch display screens will not be affected by the TFT driving signals. In contrast, the current in-cell touching technology utilizes a scanning manner that is conducted in a blank interval between two successive frames, during which the voltages output to the TFT by the source driver and gate driver both stop changing, and the crosstalk introduced to the touch driving electrode Tx and the touch sensing electrode Rx by the driving signals is at the lowest level. However, the electric charges on the parasitic and coupling capacitors will introduce crosstalk to the signals because the touch driving electrode Tx line and the Vcom line are shared.

The flow chart for current in-cell touch display screen driving is shown in FIG. 2: when the touch control integrated circuit (IC) is performing initialization scanning, the liquid crystal panel is not driven yet, and the amount of charges on the parasitic capacitor Cs is zero; after writing of data of the last line in each frame is completed, the touch control IC performs scanning and compares data obtained by this scanning with data obtained during the initialization scanning so as to determine if any touch behavior just occurs. As shown in FIGS. 3 and 4, by graphing the comparison result of the touch control IC, we can see that, even if there is no touch, the comparison data may also vary when the picture is changed (as shown in FIGS. 3A-3B and 4A-4B), due to the effect of the charges on the parasitic capacitor Cs (as shown in FIGS. 3C and 4C), and this will lead to erroneous judgment.

SUMMARY

In order to solve the above problem, the present disclosure presents a display driving method and apparatus for an in-cell touch display screen, and a display apparatus. By inserting a special picture before normally display and between any two successive frames of the display picture, the present disclosure ensures that the same picture (i.e. the special picture) is displayed on the screen when scanning the touch sensor electrodes and thus prevents the parasitic and coupling capacitors from affecting the scanning result of the touch sensor electrodes. Meanwhile, in order to prevent display of the special picture from affecting the visual effect, the present disclosure also performs backlight control while displaying the special picture.

According to one aspect of the present disclosure, a display method for an in-cell touch display screen is provided, the method comprises the following steps:

outputting a predetermined picture;

performing initialization scanning on touch sensor electrodes of a TFT array substrate to obtain initialization scanning data as basic data;

alternately outputting a display picture and the predetermined picture, and after the predetermined picture is output, scanning the touch sensor electrodes to obtain display scanning data;

comparing the display scanning data and the basic data to determine whether a touch occurs.

Preferably, the predetermined picture is one that makes crosstalk introduced by voltages on parasitic capacitors and coupling capacitors to touch signal to be smaller, wherein the parasitic capacitors are parasitic capacitors between the touch sensor electrodes and a common electrode on the TFT array substrate, and the coupling capacitors are coupling capacitors between the touch sensor electrodes and a common electrode on the TFT array substrate.

Preferably, the predetermined picture is a purely black picture or a purely white picture.

Preferably, the predetermined picture is output in a manner that data are simultaneously written into multiple lines.

Preferably, the method further comprises: controlling a backlight when outputting the display picture and the predetermined picture.

Preferably, controlling the backlight comprises: turning on or off the backlight, or adjusting brightness of the backlight.

Preferably, when difference between the display scanning data and the basic data is larger than a predetermined threshold, it is determined that a touch occurs.

Preferably, the method further comprises: initializing a timing controller prior to outputting the predetermined picture.

According to another aspect of the present disclosure, a display driving apparatus for an in-cell touch display screen is provided, the apparatus comprises:

a processor, including a hardware configured to:

outputting a predetermined picture;

performing initialization scanning on touch sensor electrodes of a TFT array substrate to obtain initialization scanning data as basic data;

alternately outputting a display picture and the predetermined picture, and after the predetermined pictured is output, scanning the touch sensor electrodes to obtain display scanning data;

comparing the display scanning data and the basic data to determine whether a touch occurs.

Preferably, the predetermined picture is one that makes crosstalk introduced by voltages on parasitic capacitors and coupling capacitors to touch signal to be smaller, wherein the parasitic capacitors are parasitic capacitors between the touch sensor electrodes and a common electrode on the TFT array substrate, and the coupling capacitors are coupling capacitors between the touch sensor electrodes and a common electrode on the TFT array substrate.

Preferably, the predetermined picture is a purely black picture of a purely white picture, Preferably, the hardware is configured to output the predetermined picture in a manner that data is simultaneously written into multiple lines.

Preferably, the hardware is further configured to control a backlight when outputting the display picture and the predetermined picture.

Preferably, the hardware is configured to turn on or off the backlight, or adjust brightness of the backlight.

Preferably, the hardware is configured to determine that a touch occurs when difference between the display scanning data and the basic data is larger than a predetermined threshold.

Preferably, the hardware is further configured to initialize a timing controller prior to outputting the predetermined picture.

According to another aspect of the present disclosure, a display apparatus is provided, wherein the display apparatus comprises the in-cell touch display screen and the display driving apparatus as mentioned above.

Using the above solutions, the present disclosure can prevent the parasitic and coupling capacitors from affecting the scanning result of the touch control IC, and thus reduce the possibility of erroneous judgment of touches.

THE DESCRIPTION OF EMBODIMENTS

In order to make objects, technical solutions and advantages of the present disclosure more clear, the present disclosure will be described in detail herein with reference to the drawings and by way of embodiments. Obviously, the illustrated embodiments are only exemplary and do not cover all possible embodiments. Based on these embodiments, those skilled in the art would readily conceive other possible embodiments without any creative efforts, all of which belong to the scope of the present disclosure.

Figure 1:
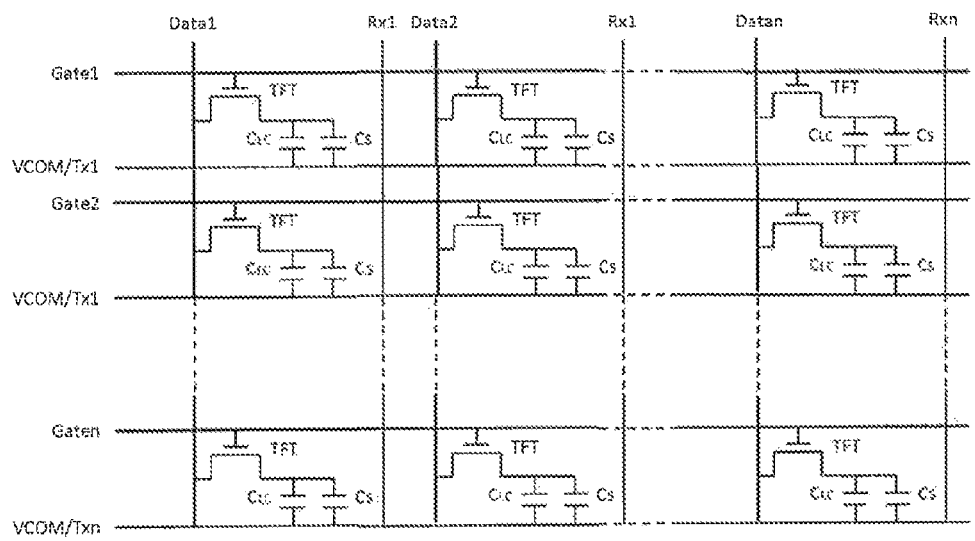
FIG. 1 is a diagram of an existing circuit structure of a liquid crystal screen using the in-cell touching technology.
Figure 2:
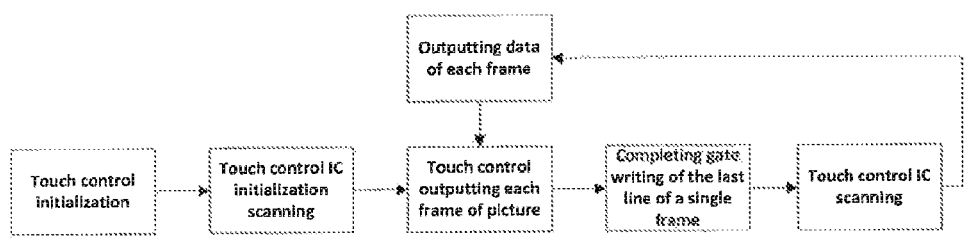
FIG. 2 is a flow chart for an existing process of an in-cell touch display screen driving.
Figure 3A:
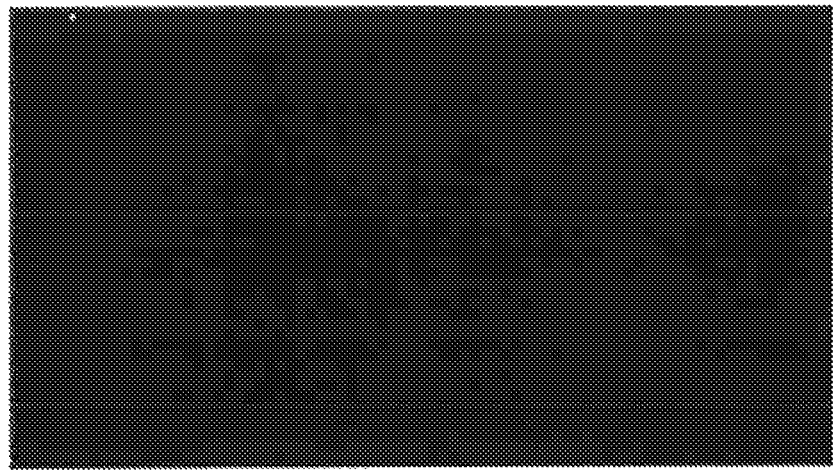
FIG. 3 shows a set of diagrams illustrating relations between the touch control IC scanning result and the picture display content when there is no touch, according to the related art.
Figure 3B:
Figure 3C:
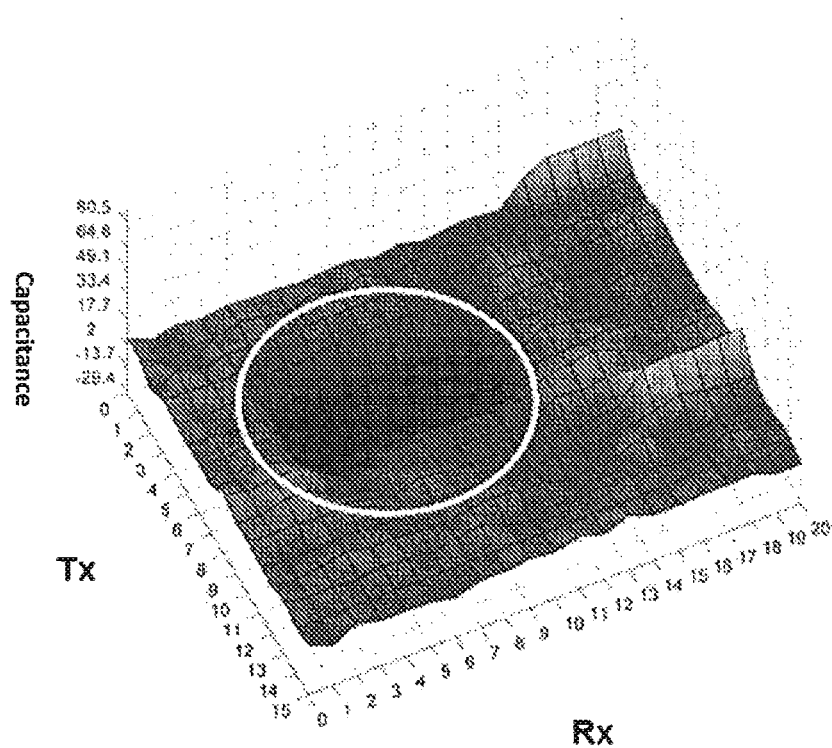
Figure 4A:
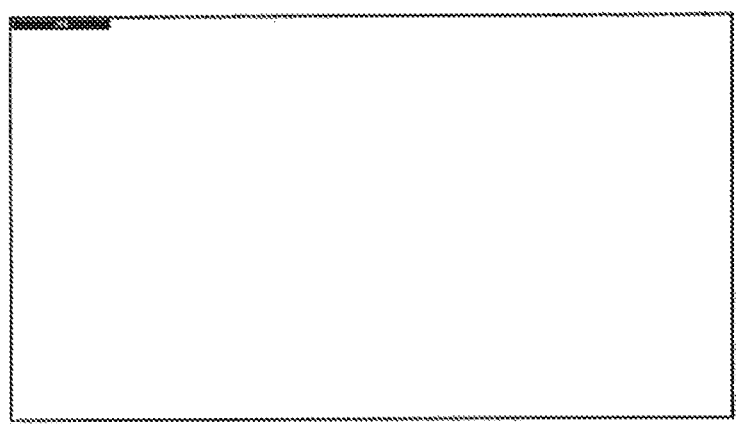
FIG. 4 shows another set of diagrams illustrating relations between the touch control IC scanning result and the picture display content when there is no touch, according to the related art.
Figure 4B:
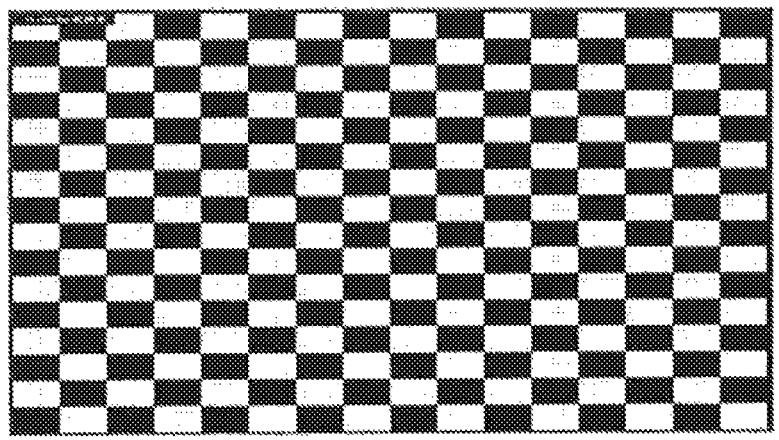
Figure 4C:
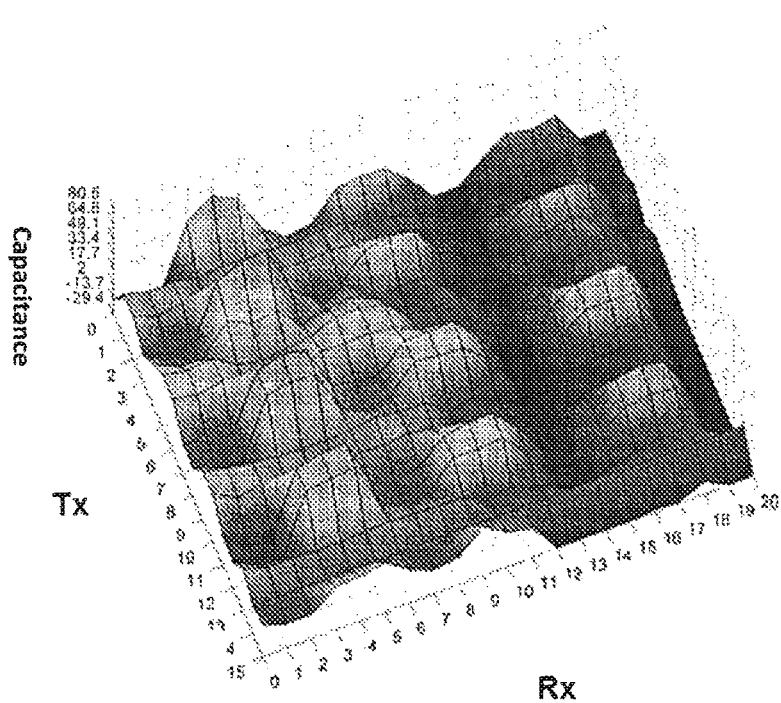
Figure 5:
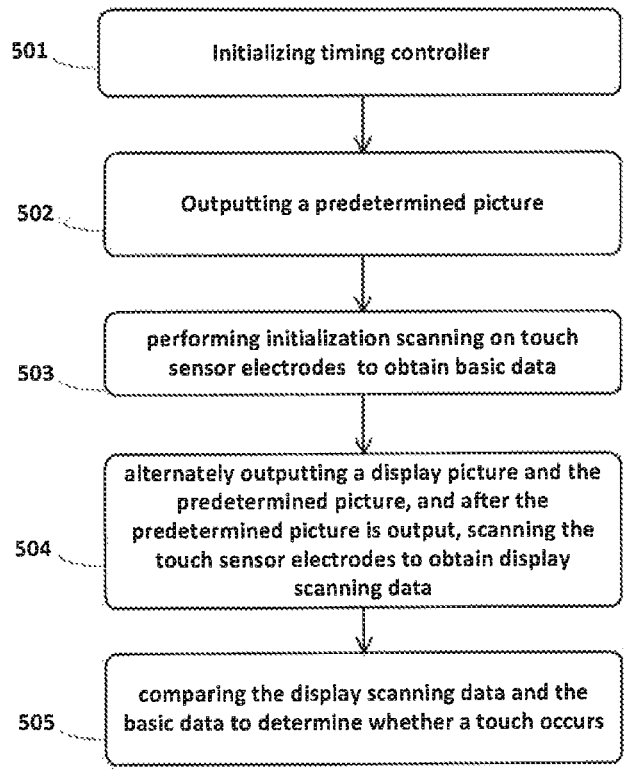
FIG. 5 shows a flow chart of a driving method for an in-cell touch display screen according to an embodiment of the present disclosure.

FIG. 5 shows a flow chart of a display driving method for an in-cell touch display screen according to an embodiment of the present disclosure.

At step 501, a timing controller is initialized. When the capacitive in-cell touch display screen is performing driving, the timing controller is used to control a startup sequence of the drivers, such as a data driver, a touch controller and a backlight controller. For this reason, a timing controller is initialized firstly.

At step 502, a predetermined picture is output under control of the timing controller.

Preferably, the predetermined picture is one that makes crosstalk introduced to touch signal by voltages on parasitic capacitors and coupling capacitors to be smaller, wherein both the parasitic capacitors and the coupling capacitors are between the touch sensor electrodes (touch driving electrodes/touch sensing electrodes) and a common electrode on the TFT array substrate.

In other words, when the predetermined picture is displayed on the capacitive in-cell touch display screen, the parasitic capacitors and the coupling capacitors will introduce no or little crosstalk to the touching signals. Preferably, the predetermined picture is a pure color picture, which includes but not limited to, a purely black picture, a purely white picture, etc.

In one embodiment, when the display driving on the predetermined picture is performed, it may be done in a manner that data are simultaneously written into multiple lines, so as to reduce the writing time for the predetermined picture.

At step 503, initialization scanning is performed on touch sensor electrodes of a TFT array substrate to obtain initialization scanning data, and the initialization scanning data is used as basic data for subsequently determining whether a touch occurs.

It is noted herein that, during performing the initialization scanning on the touch sensor electrode, the predetermined picture is displayed on the capacitive in-cell touch display screen.

At step 504, a display picture and the predetermined picture are alternately output, and after the predetermined picture is output, the touch sensor electrodes are scanned to obtain display scanning data.

In step 504, the predetermined picture is inserted into any two successive frames of the display picture to ensure that the same picture (i.e. the predetermined picture) is displayed by the capacitive in-cell touch display screen each time the touch sensor electrode is being scanned, so as to prevent the parasitic and coupling capacitors from affecting the scanning result.

At step 505, the display scanning data and the basic data are compared to determine whether a touch occurs, and thus the touch and display driving for the capacitive in-cell touch display screen is completed.

When difference between the display scanning data and the basic data is larger than a predetermined threshold, it is determined that a touch occurs.

In order to eliminate the negative impact on the visual effect when displaying the predetermined picture, a backlight is controlled when outputting the display picture and the special picture. The backlight control comprises various control operations such as turning on or off the backlight, or adjusting brightness of the backlight. For example, the backlight may be turned off when displaying the predetermined picture, so as to prevent the predetermined picture from affecting the visual effect.

Figure 6:
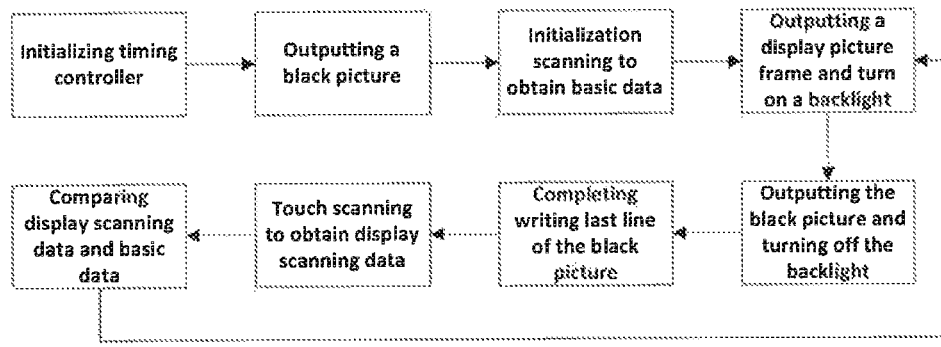
FIG. 6 shows a flow chart of a driving method for an ADS mode based in-cell touch display screen according to another embodiment of the present disclosure.
Figure 7:
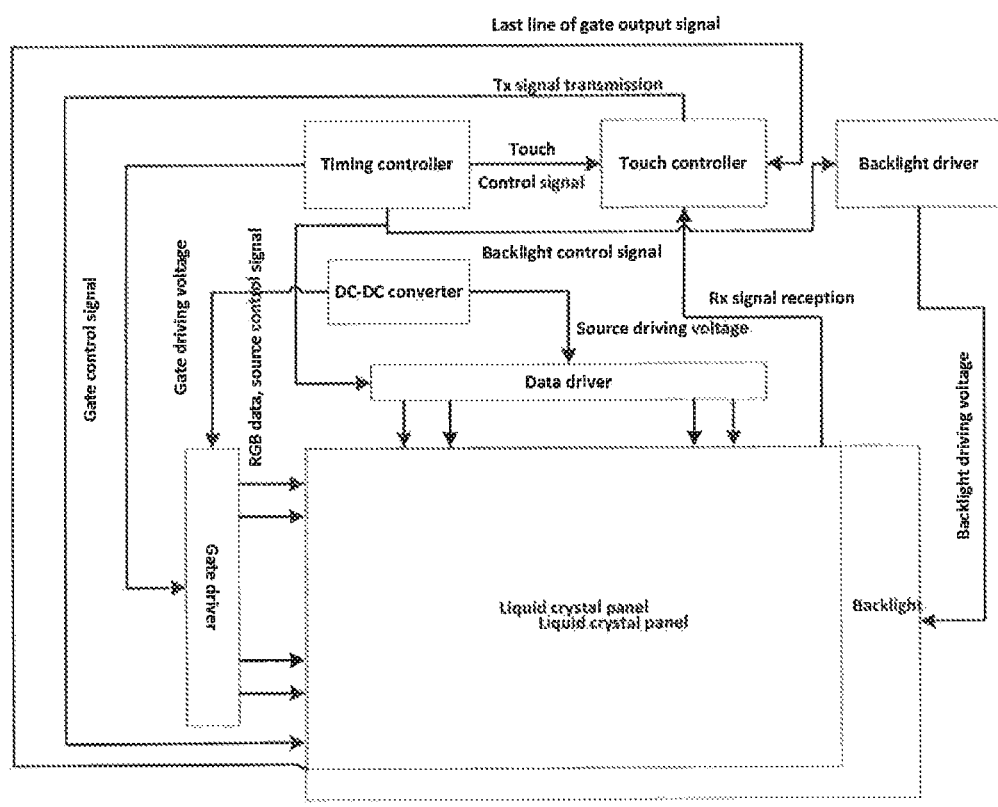
FIG. 7 shows a structural diagram of a driving system of an in-cell touch display screen according to an embodiment of the present disclosure.

Next, referring to FIGS. 6-7, the present disclosure is further explained and illustrated, and an in-cell touch display screen based on a normally black display mode of ADS (advanced super dimension switch) is taken as example.

FIG. 6 shows a flow chart of a driving method for an ADS mode based in-cell touch display screen according to another embodiment of the present disclosure. FIG. 7 shows a structural diagram of a driving system of an in-cell touch display screen according to an embodiment of the present disclosure.

For the normally black mode, a black picture is chosen as the predetermined picture in the present embodiment. According to this embodiment, the display driving method comprises the following steps.

Firstly, a timing controller is initialized.

Then, under control of the timing controller, a data driver outputs a black picture. Meanwhile, a backlight driver turns off backlight to be adapted to display the black picture.

Initialization scanning is performed on touch sensor electrodes, that is, signals of touch sensor electrodes are scanned to obtain initialization scanning data as basic data.

Then, under control of the timing controller, the data driver outputs a first frame of the display picture. Meanwhile, the backlight driver turns on the backlight to be adapted to display the display picture, and at this point of time, the first frame of the display picture is displayed on the in-cell touch display screen.

Subsequently, the backlight driver turns off the backlight, and the timing controller controls the data driver to output the black picture.

After the data driver completes writing of the data of the last line in the black picture, scanning of the touch sensor electrodes is triggered and data obtained by this scanning is compared with the basic data to determine if any touch behavior just occurs.

Then, the timing controller controls the data driver to output a second frame of the display picture. Meanwhile, the backlight driver turns on the backlight again, and at this point of time, the second frame of the display picture is displayed on the in-cell touch display screen.

Then, the backlight driver turns off the backlight, and the timing controller controls the data driver to output the black picture. After the data driver completes writing of the data of the last line in the black picture, scanning of the touch sensor electrodes is triggered and data obtained by this scanning is compared with the basic data to determine if any touch behavior just occurs.

The display picture and the black picture are alternately output according to the above steps, and each time the black picture is output, determination of the touch action is performed, such that the touch and display driving of the in-cell touch display screen is achieved.

The black picture is a pure color picture, therefore, when writing the black picture, the writing to multiple lines may be performed simultaneously to improve writing speed and thus save time for the scanning of the touch sensor electrodes.

According to the above solution, by inserting a special picture before normally display and between any two successive frames of the display picture, the present disclosure ensures that the same picture is displayed on the display screen when scanning the touch sensor electrodes and thus prevents various voltages on the TFT array substrate from introducing crosstalk to the touching signals as the pictures alternate. Meanwhile, in order to eliminate the negative impact on the visual effect when displaying the special picture, the present disclosure also performs a backlight control while displaying the special picture.

According to another aspect of the present disclosure, an in-cell touch display screen is provided.

According to another aspect of the present disclosure, a display apparatus is provided, wherein the display apparatus comprises an in-cell touch display screen and a displaying driving apparatus according to any of the above embodiments.

It is noted that, the subject matters sought to be protected by the present application are not limited in scope to the embodiments as stated above. For example, some embodiments may be in form of hardware for operate on for example a device or a combination of devices, and other embodiments may be in form of software and/or firmware. Similarly, although the subject matters are not limited in scope in this respect, some embodiments may comprise one or more articles, on which instructions may be stored, the instructions when executed by a computer system, a computer platform or other systems may cause the processor to perform according to the claimed subject matters, such as one of the above embodiments. One possible approach is that, the computer platform may comprise one or more processing units or processors, one or more input/output devices (e.g. a displays, a keyboard and/or a mouse) and one or more memories (e.g. a static random access memory, a dynamic random access memory, a flash memory and/or a hardware).The above embodiments further illustrate objects, technical solutions and benefits of the present disclosure. It should be appreciated that, such embodiments are only exemplary and do not serve to limit the scope of the disclosure. Any modifications, substitutions, and improvements that do not depart from the spirits and principles of the present disclosure should be within the scope of the present disclosure.

What is claimed is:

1. A display method for an in-cell touch display screen comprising:
   in a pre-display phase,
      outputting a predetermined picture;
      performing initialization scanning on touch sensor electrodes of a TFT array substrate to obtain initialization scanning data as basic data; and
   in a display phase,
      outputting display picture frames and outputting the predetermined picture between every two consecutive display picture frames, and every time the predetermined picture is output, scanning the touch sensor electrodes to obtain display scanning data; and
      comparing the display scanning data and the basic data to determine whether a touch occurs.

2. The method according to claim 1, wherein the predetermined picture is one that makes crosstalk introduced by voltages on parasitic capacitors and coupling capacitors to touch signal smaller, wherein the parasitic capacitors are parasitic capacitors between the touch sensor electrodes and a common electrode on the TFT array substrate, and the coupling capacitors are coupling capacitors between the touch sensor electrodes and a common electrode on the TFT array substrate.

3. The method according to claim 1, wherein the predetermined picture is a purely black picture or a purely white picture.

4. The method according to claim 1, wherein the predetermined picture is output in a manner that data is simultaneously written into multiple lines.

5. The method according to claim 1, further comprising:
controlling a backlight when outputting the display picture frames and the predetermined picture.

6. The method according to claim 5, wherein backlight control is selected from the group consisting of turning on or off the backlight, or adjusting brightness of the backlight, and combinations thereof.

7. The method according to claim 1, wherein when a difference between the display scanning data and the basic data is larger than a predetermined threshold, it is determined that the touch occurs.

8. The method according to claim 1, further comprising:
initializing a timing controller prior to outputting the predetermined picture in the pre-display phase.

9. A display driving apparatus for an in-cell touch screen, the apparatus comprising:
a processor, including a hardware configured to:
in a pre-display phase,
output a predetermined picture;
perform initialization scanning on touch sensor electrodes of a TFT array substrate to obtain initialization scanning data as basic data; and
in a display phase,
output display picture frames and output the predetermined picture between every two consecutive display picture frames, and every time the predetermined picture is output, scan the touch sensor electrodes to obtain display scanning data;
compare the display scanning data and the basic data to determine whether a touch occurs.

10. A display apparatus comprising an in-cell touch display screen and the display driving apparatus according to claim 9.

11. The apparatus according to claim 9, wherein the predetermined picture is one that makes crosstalk introduced by voltages on parasitic capacitors and coupling capacitors to touch signal smaller, wherein the parasitic capacitors are parasitic capacitors between the touch sensor electrodes and a common electrode on the TFT array substrate, and the coupling capacitors are coupling capacitors between the touch sensor electrodes and a common electrode on the TFT array substrate.

12. The apparatus according to claim 9, wherein the predetermined picture is a purely black picture or a purely white picture.

13. The apparatus according to claim 9, wherein the hardware is configured to output the predetermined picture in a manner that data is simultaneously written into multiple lines.

14. The apparatus according to claim 9, wherein the hardware is further configured to control a backlight when outputting the display picture frames and the predetermined picture.

15. The apparatus according to claim 14, wherein the hardware is configured to perform a control operation including at least one of turning on or off the backlight, and adjusting brightness of the backlight.

16. The apparatus according to claim 9, wherein the hardware is configured to determine that a touch occurs when difference between the display scanning data and the basic data is larger than a predetermined threshold.

17. The apparatus according to claim 9, wherein the hardware is further configured to initialize a timing controller prior to outputting the predetermined picture in the pre-display phase.

* * * * *